United States Patent
Bergling et al.

(10) Patent No.: US 7,984,928 B2
(45) Date of Patent: Jul. 26, 2011

(54) SAFETY COUPLING

(75) Inventors: Fredrik Bergling, Nyhamnslage (SE); Curt Persson, Hyllinge (SE); Lennart Stromberg, Helsingborg (SE)

(73) Assignee: AB PH, Nederman & Co., Helsingborg (SE)

( * ) Notice: Subject to any disclaimer, the term of this patent is extended or adjusted under 35 U.S.C. 154(b) by 58 days.

(21) Appl. No.: 12/521,844

(22) PCT Filed: Jan. 16, 2008

(86) PCT No.: PCT/SE2008/000029
§ 371 (c)(1),
(2), (4) Date: Jun. 30, 2009

(87) PCT Pub. No.: WO2008/088272
PCT Pub. Date: Jul. 24, 2008

(65) Prior Publication Data
US 2010/0066079 A1    Mar. 18, 2010

(30) Foreign Application Priority Data

Jan. 18, 2007 (SE) ...................................... 0700115

(51) Int. Cl.
*F16L 35/00* (2006.01)

(52) U.S. Cl. ..................... 285/1; 285/123.15; 285/123.1
(58) Field of Classification Search ........... 285/1, 123.3, 285/123.5, 277, 316, 123.4, 123.15, 123.1
See application file for complete search history.

(56) References Cited

U.S. PATENT DOCUMENTS

| 137,823 | A | * | 4/1873 | Button ................... 285/1 |
| 2,409,650 | A | | 10/1946 | Wiggins et al. |
| 2,511,765 | A | * | 6/1950 | Bradbury ............... 285/1 |
| 2,512,939 | A | * | 6/1950 | Hollerith ............... 285/1 |
| 2,699,961 | A | * | 1/1955 | Omon et al. ........... 285/1 |
| 2,806,716 | A | * | 9/1957 | Brown .................. 285/1 |
| 2,930,633 | A | * | 3/1960 | Ethington et al. ...... 285/1 |
| 3,549,175 | A | * | 12/1970 | Evens .................. 285/1 |
| 4,485,845 | A | | 12/1984 | Brady |
| 4,491,297 | A | * | 1/1985 | Maier et al. .......... 285/123.1 |
| 4,691,941 | A | | 9/1987 | Rabushka et al. |
| 4,719,752 | A | | 1/1988 | Hall |
| 4,865,077 | A | * | 9/1989 | Batchen et al. ........ 285/1 |
| 5,454,602 | A | * | 10/1995 | Anderson et al. ...... 285/1 |
| 5,816,621 | A | * | 10/1998 | Frost .................. 285/1 |
| 6,749,231 | B2 | * | 6/2004 | LeMay et al. ......... 285/321 |
| 2003/0057698 | A1 | | 3/2003 | Parrott et al. |

FOREIGN PATENT DOCUMENTS

| DE | 196 22 860 A1 | 1/1997 |
| DE | 200 10 546 A | 11/2001 |
| WO | 0242015 | 5/2002 |

* cited by examiner

*Primary Examiner* — David E Bochna
(74) *Attorney, Agent, or Firm* — Volpe and Koenig, P.C.

(57) ABSTRACT

A safety coupling for the releasable connection of a nozzle to a duct system is disclosed. The safety coupling is adjustable between a coupled position, in which the coupling parts are coupled together to lock the connection of the nozzle to the duct system, and a decoupled position, in which the coupling parts are separable to allow release of the nozzle from the duct system. An actuating member is arranged to move the coupling member from the coupled position into the decoupled position when the coupling member is subjected to a disengagement force exceeding a predetermined limit value.

17 Claims, 7 Drawing Sheets

SAFETY COUPLING

TECHNICAL FIELD

The invention relates to a safety coupling, for the releasable connection of a nozzle to a duct system, which nozzle and duct system form part of an extraction system.

BACKGROUND OF THE INVENTION

The extraction system in which a connecting element in the form of a hose or nozzle is connected to an exhaust-gas source is commonly used. Typical examples are inspection halls, assembly halls, workshops or parking halls for emergency vehicles in which the connecting element is connected to the exhaust pipe of the vehicle. The connecting element is generally designed such that its engagement with the exhaust pipe is released when the vehicle drives off. For safety reasons, the system should be provided with a safety coupling which is intended to disengage if the force between the connecting element and the exhaust-gas source exceeds a certain limit value. Without a safety coupling, the connecting element, which is often formed by a nozzle and associated hose section, can flick back with great force in an uncontrolled manner when the connection to the exhaust pipe comes loose. This can cause significant damage to, for example, vehicle and personnel, but also to, for example, the suspension or securement of the system.

The safety couplings can be based, for example, on friction, in which case two flanged coupling halves are held together by means of a surrounding rubber collar. The functioning is here dependent on the configuration, tolerances and possible deformations, caused by previous disengagements, of the flanges, but also on the material, configuration and condition of the collar.

Another example, which is a combined friction and spring solution, is given in WO 02/42015 A1. The safety coupling which is described therein comprises a first and a second tubular coupling half, each of which comprises a flange portion. One flange portion is straight and the other is conical. A resilient locking ring is arranged to grip over the two flange portions in order to hold together the two coupling halves. The locking ring comprises mutually movable segments, which, with spring arrangements, are resiliently pretensioned into a first position, in which the locking ring straddles the flanges and holds together the two coupling halves. The segments are displaceable counter to the pretension force into a second position, in which the flange portions and thus the coupling halves can be moved apart. The solution is intrinsically complicated and expensive, at the same time as it is tolerance-sensitive, since it is based on the locking ring sliding over a conical surface of the flange portions during disengagement.

Another principle is given in DE 19622860. The safety coupling which is described therein forms part of an exhaust-gas extraction device, which is equipped with a slotted suction duct on which a trolley can be run. The safety coupling comprises two external hose coupling parts for coupling together two hose ends. Inside the respective hose coupling parts there is a wire coupling part. Each wire coupling part is connected to a wire. In the coupled state, the wire, via the safety coupling, will run between the nozzle and the trolley. The wire coupling is spring-loaded for disengagement should a preset limit value load be exceeded. The technology is relatively complicated and requires some fine-tuning in order to work.

Other solutions employ shearing pins which break if a certain limit value is exceeded. These solutions are awkward to reset after disengagement and further require that the user maintains a spare parts store.

Many known solutions are complicated to reset and, moreover, often require two persons. The latter applies, in particular, to those solutions which are based on friction, since the resetting requires that the friction force required for disengagement has to manually overcome in the resetting. A contributory factor is that the disengagement forces normally range between 250 and 500 N. In addition, many known safety couplings are often also provided with supplementary shock-absorbing rubber covers, which make resettings yet more difficult, since these generally have to be forced into place.

OBJECT OF THE PRESENT INVENTION

One object of the present invention is to provide a safety coupling which has a well-defined disengagement force, which force can easily be chosen depending on the application.

Another object is to provide a safety coupling which, with a simple manoeuvre by a person, can be reset after disengagement.

A further object is that the safety coupling shall be ergonomic and allow integration of other functions, such as, for example, pneumatics, which pneumatics, for example, is used in connecting the extraction system to the exhaust-gas source.

The safety coupling should also be simple to install in both new and existing extraction systems.

SUMMARY OF THE INVENTION

For the achievement of the above-specified and other non-specified objects which will emerge from the following description, the present invention relates to a safety coupling for the releasable connection of a nozzle to a duct system, which nozzle and duct system form part of an extraction system. The safety coupling is characterized by a coupling member having a first coupling part, which is adapted for fitting in the nozzle, and a second coupling part, which is adapted for fitting in the duct system, which coupling member is a pneumatic coupling member, wherein said first and second coupling parts are adapted to be brought together for connection of the nozzle to the duct system, and wherein the coupling member, in the joined state of the coupling parts, are adjustable between a coupled position, in which the coupling parts are coupled together to lock the connection of the nozzle to the duct system, and a decoupled position, in which the coupling parts are separable to allow release of the nozzle from the duct system, and an actuating member, which is arranged to move the coupling member from the coupled position into the decoupled position when the coupling member is subjected to a disengagement force exceeding a predetermined limit value.

The term nozzle is intended to embrace that part of the extraction system which is intended for connection to an exhaust-gas source and can embrace both a simple nozzle and a nozzle with associated hose section. It will be recognized that the invention is also applicable in systems other than for the extraction of exhaust gases. The following description, however, will be based on use in an exhaust-gas extraction system.

By virtue of the invention, a safety coupling is produced which is simple to reset after disengagement.

The actuating member and the coupling member constitute two separate members, in which the coupling parts of the coupling member can be moved into a joined state for locking the connection of the nozzle to the duct system without regard to the actuating member. This means that, unlike some known prior art based on friction solutions, the operator, when resetting the safety coupling after disengagement, does not need to apply a force which substantially corresponds to or exceeds the disengagement force, i.e. the force for which the safety coupling is dimensioned to disengage, but merely the force which is needed to bring together the coupling parts into the coupled position of the coupling member. This force is generally substantially less than the disengagement force, so that the operator can perform the resetting by himself and entirely without tools or spare parts. The coupling member can be formed by the type of rapid-coupling member which is well known within the repeatable coupling of fluid-distribution lines. By rapid coupling is meant, in this context, the type of coupling member which is used within, for example, fluid distribution, in which the two coupling parts of the coupling member can be brought together into locking engagement with each other by an axial motion and in which decoupling is allowed by the displacement of a locking member by a preferably axial motion which is oppositely directed to or coincides with the direction of joining of the coupling parts. The locking member is generally disposed on that part of the coupling member which constitutes a female part. This type of coupling member, precisely because of the repeatable coupling, is designed to require a low coupling force. The use of this type of coupling member also means that the cost of the safety coupling member can be kept low.

The safety coupling is also designed such that, with its parts, it can be readily fitted inside the nozzle and the duct system respectively, so that it has no projecting parts which may be damaged, or which may damage the surroundings upon disengagement. This also means, unlike the prior art, that the use of protective rubber covers can be eliminated or be arranged in such a way that they do not need handling in the event of a resetting.

The fact that the coupling member is a pneumatic rapid-coupling member allows the safety coupling to be used regardless of whether it is intended for use in an extraction system which embraces pneumatics, or not. Where the system embraces pneumatics, the safety coupling can easily be connected to the pneumatics and can form a part of its piping. Otherwise, only the coupling function per se can be utilized.

The force which is needed to bring together the coupling parts into said joined state is advantageously less than the limit value for said disengagement force. The force which is needed to move the coupling member between the decoupled position and the coupled position is entirely dependent on the design of the chosen coupling member and, through the choice of a coupling member of the rapid-coupling type according to the above, this is intrinsically designed to require a low force for coupling of the coupling parts. The disengagement force, on the other hand, is dependent on the design of the actuating member. The disengagement force and the force which is needed for resetting are therefore two entirely separate forces. Upon resetting following disengagement, the operator therefore has only to overcome the force which is needed to couple together the two parts of the coupling member instead of, as in the prior art, substantially overcoming the disengagement force for which the safety coupling is dimensioned.

The actuating member can be arranged to move the coupling member from the coupled position into the decoupled position after a predetermined displacement of the nozzle and the duct system in the direction away from each other, the force which is required to produce this displacement being defined by an elastic element.

The elastic element can be likened to a brake mechanism, since the elastic element must be compressed in accordance with said predetermined displacement before the safety coupling is allowed to disengage. Through a suitable choice of elastic element and, more precisely, the spring characteristics of the element, the user can easily adapt the safety coupling to the intended application and, for example, any standards pertaining to disengagement force. The use of an elastic element also allows a very well-defined disengagement force with very high repeatability, which is not sensitive to production tolerances or deformations which may have been caused by earlier disengagements.

The predetermined displacement can be determined by a stop member cooperating with the actuating member. The cooperation between the actuating member and the stop member can be realized in a number of different ways, for example by a cutout which cooperates with a lug, or by a wire with a certain slack which has to be overcome.

The actuating member can be arranged to engage with one of the two coupling parts of the coupling member, which coupling part constitutes a female part.

The actuating member, the coupling part engaging with the actuating member, and said elastic element can be disposed on a common shaft. This allows a very compact solution, since the safety coupling can easily be installed inside the nozzle, or alternatively the duct system.

The limit value for said disengagement force is determined by the spring characteristics of the elastic element. The elastic element can be a spring element, said limit value being set by the choice of spring constant of the spring element. The elastic element can also be an elastomer, the limit value being set by the choice of modulus of elasticity of the elastomer. This allows a safety coupling which has firstly a very well-defined disengagement force with no calibration requirements, and secondly a very high repeatability. The user can very easily adapt one and the same safety coupling to the desired disengagement force, since the relationship between force and displacement is known for a given spring element or a given elastomer.

The disengagement force can be adjusted by pretension of said elastic element. Hence, the user can himself set the desired disengagement force according to requirement.

The coupling member can constitute a part of a pneumatic system. A pneumatic system can be used, for example, to produce a locking and sealing effect between the nozzle and a vehicle exhaust pipe. The air supply can hereby be realized from the compressed-air source to the nozzle via the coupling member of the safety coupling. This minimizes the piping and the number of coupling elements. Furthermore, lines and coupling elements, such as, for example, valves and circuit breakers, will not be damaged upon disengagement, since these can be arranged in such a way that they are not subjected to any tensile force. Moreover, all the pneumatic components can be arranged inside the safety coupling, so that these are protected during disengagement and normal use.

The shaft, too, can constitute a part of a pneumatic system. In this case, the shaft is preferably formed by a duct, via which the coupling member is allowed to communicate with a compressed-air source.

DESCRIPTION OF DRAWINGS

The invention will be described in greater detail below for illustrative purposes with reference to the accompanying drawings, which show a currently preferred embodiment.

TECHNICAL DESCRIPTION

Figure 1:
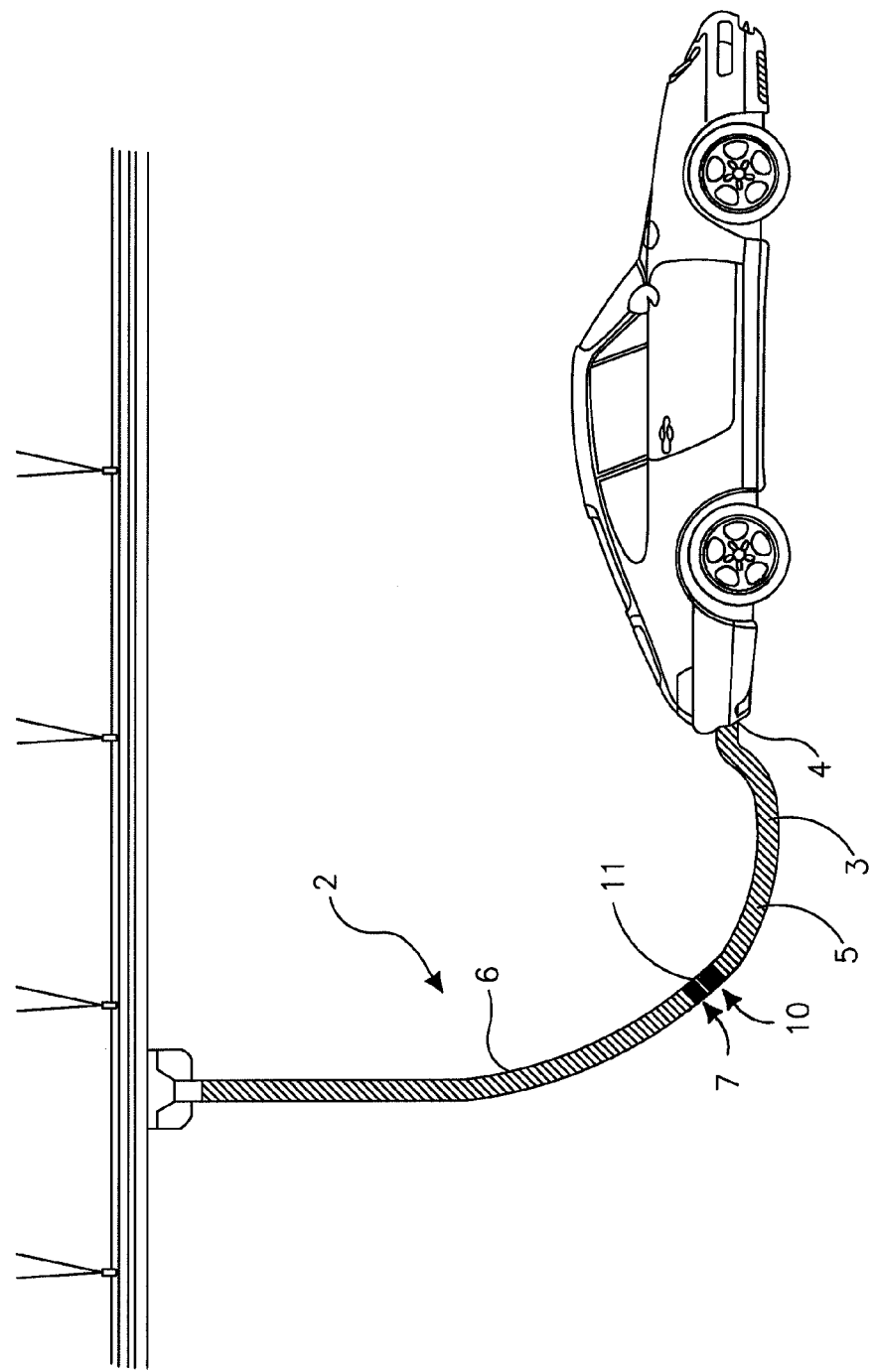
FIG. 1 shows in schematic representation an extraction system for use in the extraction of exhaust gases from a vehicle.

With reference now to FIG. 1, a first embodiment of a safety coupling according to the present invention is shown, which is installed in an extraction system 2 (shown in extremely schematic representation). The system 2 comprises a nozzle 3, which is intended for connection to an exhaust-gas source 4 such as a vehicle exhaust pipe. In the illustrated embodiment, the nozzle 3 has the form a flexible hose part 5, which at its one end has a nozzle for connection to the exhaust pipe and which at its other end comprises a first section 10 of the safety coupling 1. The extraction system 2 further comprises a duct system 6, which at its one end comprises a second section 20 of the safety coupling 1 and which at its other end is coupled to an extraction device (not shown). As will be recognized, both the nozzle 3 and the duct system 6 can be configured in a number of different ways without it affecting the invention.

The safety coupling 1 is intended for fitting in a position between the nozzle 3 and the duct system 6.

The nozzle 3 is intended to be released from its engagement with the exhaust pipe when the vehicle drives off. The force which is required for the nozzle to be released from the engagement with the exhaust pipe is generally low and is absorbed for the most part by the nozzle 3 or the duct system 6, which generally comprise flexible hose portions. The residual force transmitted to the actual safety coupling 1 is under normal circumstances less than the dimensioned disengagement force of the safety coupling 1. The safety coupling 1 is therefore only intended to be disengaged should the engagement between the exhaust-gas source 4 and the nozzle 3 not be released, i.e. when the separation force exceeds a predetermined limit value for the disengagement force.

In the following description, the terms front and rear are used. By front is meant a part which, in use, is intended to be facing towards the nozzle, and by rear is meant a part which, in use, is intended to be facing away from the nozzle. The term coupling member is also used. The coupling member is preferably formed by a conventional pneumatic coupling member of the type which is often used for rapid-releasable coupling of fluid-distribution lines. This type of coupling member is commonly used for simple repeatable coupling-together of fluid-distribution lines and is well known to the person skilled in the art, with the result that its design is not described in greater detail. The general principle is, however, that the coupling member comprises two coupling parts in the form of a male part and a female part, which can be brought together into locking engagement with each other by an axial motion. Decoupling is allowed by a usually surface-mounted, sleeve-like locking member being displaced by a preferably axial motion which is oppositely directed or coincides with the direction of joining of the coupling parts. The locking member is generally disposed on the female part.

Figure 2:
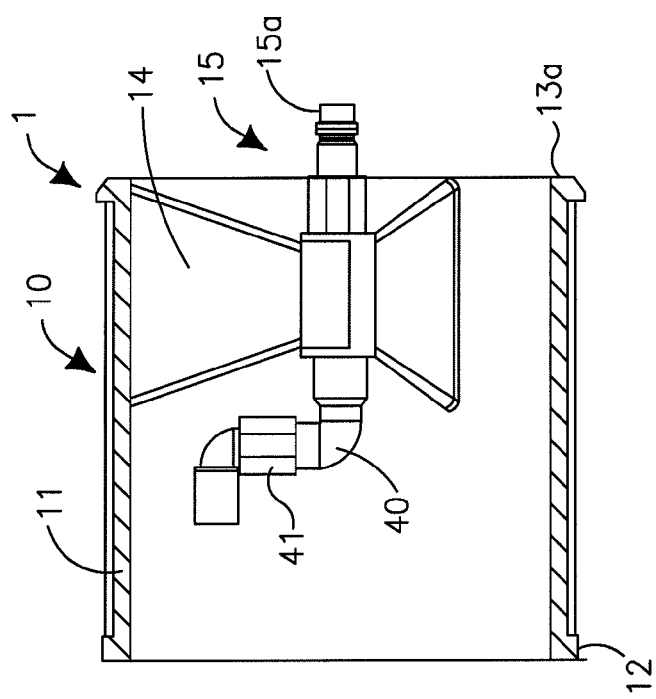
FIG. 2 shows a schematic cross section of a first section of a safety coupling according to a first embodiment of the present invention.

With reference now to FIG. 2, a schematic cross section of the first section 10 of the safety coupling 1 is shown, which is intended for fitting in the nozzle. In the illustrated embodiment, the first section 10 is formed by a circular pipe 11, which is open at both its ends. The pipe 11 can be made, for example, of plastic, composite or metal. The first section 10 comprises at its front end a connecting portion 12 for connection to the nozzle. The connection can be realized with conventional fastening members (not shown), such as a hose clip. The first section 10 comprises at its rear end a surface 13a, which is intended to bear against a complementary surface 13b belonging to a front end of the second section 20 of the safety coupling, which section will be described later.

The first section 10 comprises internally a diametrically disposed supporting portion 14, which supports a first coupling part 15a of a coupling member 15. The coupling part 15a is facing towards the rear end of the first section 10. In the illustrated embodiment, the first coupling part 15a is formed by a male part.

Figure 3:
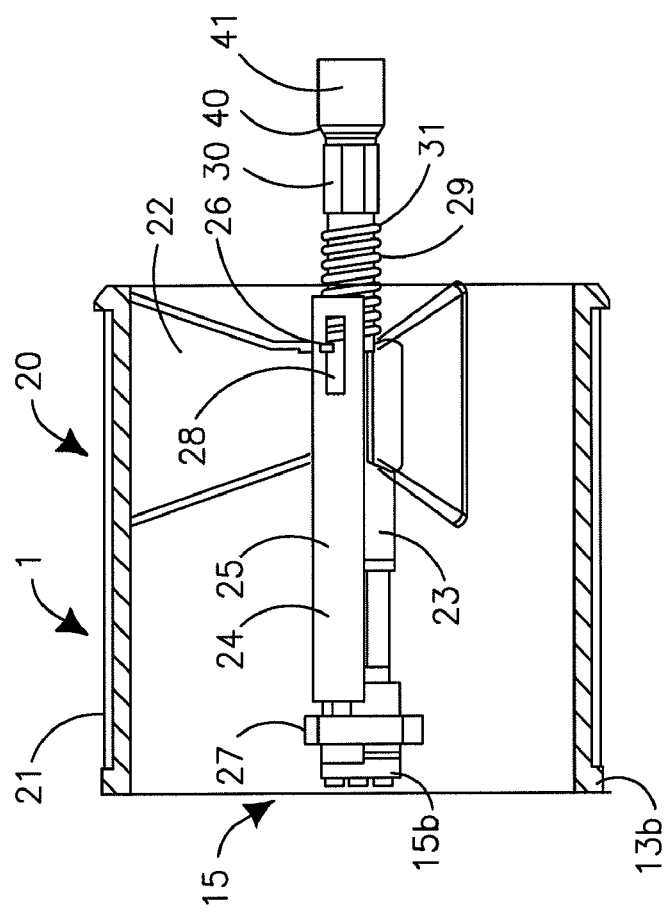
FIG. 3 shows a schematic cross section of a second section of a safety coupling according to a first embodiment of the present invention.

With reference now to FIG. 3, a schematic cross section of the second section 20 is shown, which is intended for fitting in the duct system. In the illustrated embodiment, the second section 20 is formed by a circular pipe 21, which is open at both its ends. The pipe 21 can be made, for example, of plastic, composite or metal.

The second section 20 comprises internally a diametrically disposed supporting portion 22, which supports a shaft 23 that extends axially through the supporting portion 22 and that, furthermore, can be axially moved relative to the latter. In the coupled position of the safety coupling 1, the shaft 23 is arranged to lie in line with the coupling part 16 of the first section 10.

The shaft 23 is connected at its front end to a second coupling part 15b of said coupling member 15, and this second coupling part 15b is complementary to the first coupling part 15a of the coupling member 15. In the illustrated embodiment, the second coupling part 15b is formed by a female part.

The second section 20 further comprises an actuating member 24. The purpose of the actuating member 24 is to be able to manoeuvre the second coupling part 15b into a position in which the coupling member 15 can be moved from the coupled position into the decoupled position, which occurs when the nozzle 3 and the duct system 6 are displaced by a predetermined distance in the direction away from each other and thereby subject the coupling member 15 to a force exceeding a predetermined limit value, i.e. the dimensioned disengagement force.

In the illustrated embodiment, the actuating member 24 has the form of a bracket 25, which extends between the second coupling part 15b and a stop member 26, in the form of a radial projection, disposed on the shaft 23. More precisely, the actuating member 24 extends between the surface-mounted, sleeve-like locking member 27 of the second coupling part 15b and said stop member 26. The actuating member 24 comprises at its rear end an axial cutout 28 for receiving and cooperating with the stop member 26. When the nozzle 3 and the duct system 6 are moved apart, the mutual displacement will therefore result in displacement of the actuating member 24 relative to the stop member 26 until an engagement is realized between the rear end of the cutout 28 and the stop member 26. In this position, the actuating member 24, by virtue of its connection to the second coupling part 15b, will endeavour to pull the latter in the direction away from the first coupling part 15a and thus strive for a disengagement of the coupling member 15 and thus of the safety coupling 1. It will be recognized that the corresponding principle can be applied by the actuating member 24, instead of having a cutout 28 which cooperates with a stop member 26, having a stop member which in turn cooperates with a cutout. It will be recognized that the actuating member 24, with maintained functioning, can be formed by a wire with a slack corresponding to said displacement or projections or cutouts which cooperate with complementary cutouts or projections in the pipe wall of the second section.

For dimensioning of the disengagement force, an elastic element 29 is used, which in the illustrated embodiment is disposed on and axially with the shaft 23 between the stop member 26 and an abutment 30. The elastic element 29 can be formed, for example, by an elastomer or a spring element. By elastomer is meant material which has rapid and high elastic extensibility and rapid and virtually full recoverability. The elastomer can be of rubber or a thermoelastomer. By spring element is preferably meant a spring which is intended to be loaded in its longitudinal direction. Suitable spring elements are hence tension or compression springs, leaf springs or cup springs. It will be recognized that other types of spring elements which operate in a different load direction are also possible, such as torsion springs.

In the illustrated embodiment, the elastic element 29 is formed by a compression spring 31. The compression spring 31 is disposed between the stop member 26 and the abutment 30 such that it is compressed when the shaft 23 is moved axially forwards, which occurs when the nozzle 3 and duct system 6 are displaced in the direction away from each other.

The functioning of the safety coupling 1 will be described below with reference to FIGS. 4 and 5.

Figure 4:
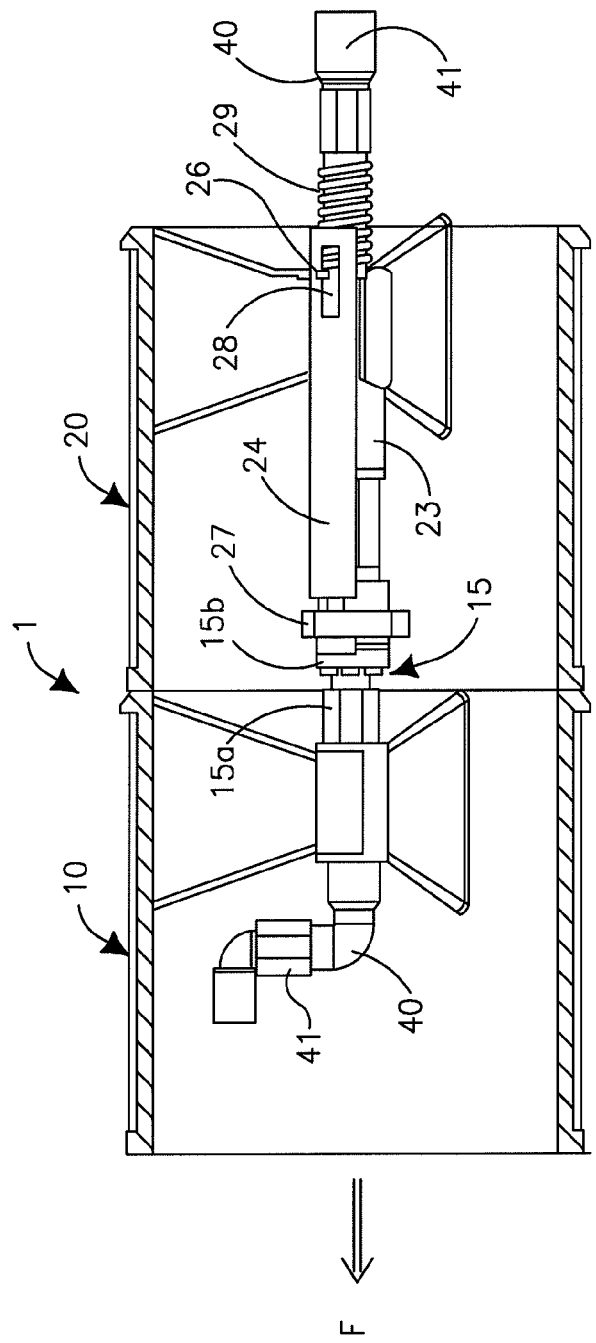
FIG. 4 shows in schematic representation a safety coupling according to the first embodiment in the coupled position.
Figure 5:
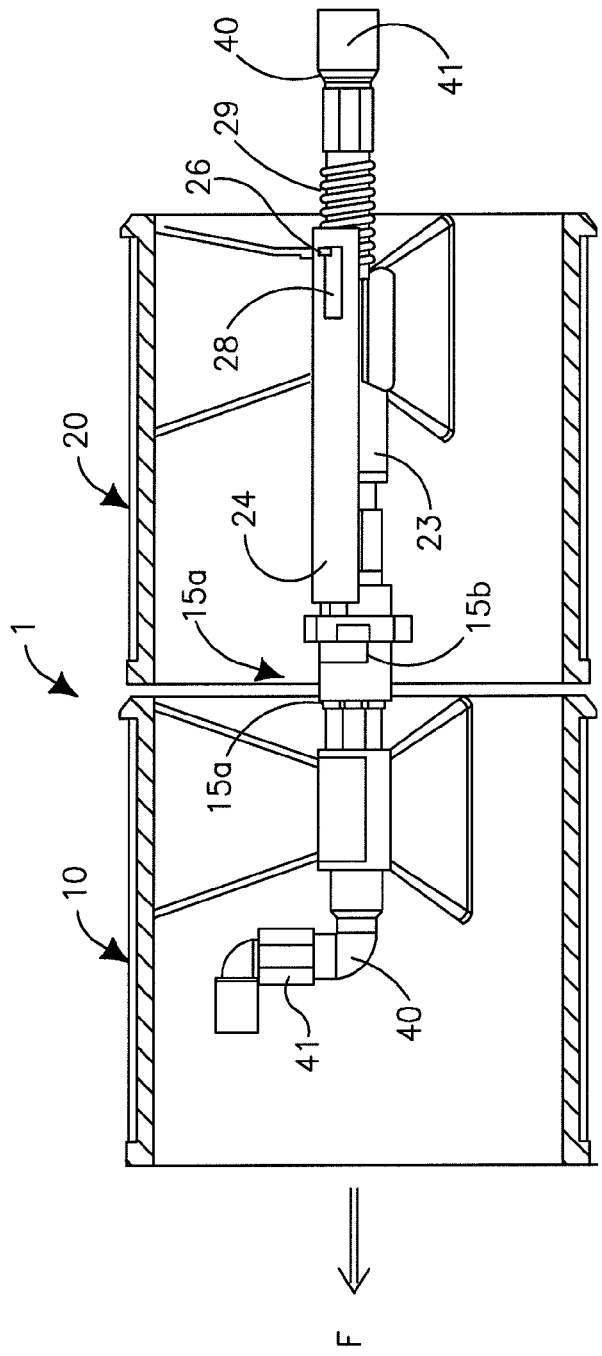
FIG. 5 shows the safety coupling according to FIG. 4 in a decoupled position.

With initial reference to FIG. 4, the safety coupling 1 is shown in its coupled position in which the nozzle and the duct system are mutually connected by the coupling of the first and second coupling parts 15a, 15b.

Should the nozzle not be separated as intended from its engagement with the exhaust-gas source, a tensile force F will be transmitted to the safety coupling 1. This results in the first section 10 of the safety coupling 1, which is disposed in the nozzle, being pulled along in the direction of the tensile force. By the first coupling part 15a, which, via the first section 10, is disposed in the nozzle, engaging with the second coupling part 15b, which, via the second section 20, is disposed in the duct system, the force F will also be transmitted to the duct system and transported in the motion. During this motion, the second coupling part 15b is allowed, by virtue of its movable arrangement on the shaft 23, to accompany the motion for a limited distance. The distance is limited by the actuating member 24. More precisely, the distance is limited by the cooperation of the cutout 28 disposed in the actuating member 24 with the stop member 26. During this motion, the elastic element 29 will simultaneously be compressed. Through a suitable choice of spring characteristics of the elastic element 29, the disengagement force can be determined. When the rear end of the cutout 28 engages with the stop member 26, a physical stop is reached for the continued displacement between nozzle and duct system, whereby the engagement between the two coupling parts 15a, 15b is released, see FIG. 5. The engagement is released by the actuating member 24 in this position pulling the sleeve-shaped locking member 27 of the second coupling part 15b rearwards relative to the first coupling part 15a, whereby the coupling parts 15a, 15b are allowed to be moved apart. More precisely, the cutout 28 is of such a length that it at least corresponds to the distance by which the second coupling part 15b (the female) has to be displaced relative to the first coupling part 15a (the male) in order for their engagement to be able to be released. The safety coupling 1 has now released and the nozzle and the duct system can be separated.

The disengagement force is easy to dimension and vary. This is realized through a suitable choice of spring characteristics of the elastic element 29, i.e. spring constant, or alternatively modulus of elasticity, depending on the type of elastic element. The relationship between force and displacement is specific to the chosen elastic element 29. In the case of a compression spring, the relationship is linear, so that the person skilled in the art is comfortably able to choose a suitable spring element depending on the desired disengagement force.

The person skilled in the art can also adjust the disengagement force by suitable pretension of the elastic element 29. This pretension can be obtained in a number of different ways, some of which will be described below. Further possible variants will be recognized by the person skilled in the art within the scope of the invention. A desired degree of pretension can be set by means of the abutment 30. The abutment 30 can be formed, for example, by a nut which can be moved along a threaded shaft. This shaft can expediently be formed by the shaft on which the elastic element is disposed. By moving the nut variously far along the shaft, a desired degree of pretension is obtained. The abutment 30 can also be formed by a peg, which is disposed in one of a plurality of holes made on a shaft. The position of the peg hence determines the degree of pretension. A third variant is that the abutment 30 is formed by a number of spacers, which are added behind the elastic element for pretension thereof. Regardless of the solution, the safety coupling can hence be supplied complete with a preset disengagement force, whereafter the user can set the desired disengagement force by adjusting the pretension of the elastic element.

For resetting of a disengaged safety coupling 1, the nozzle and the duct section, i.e. the first and second sections 10, 20, are brought axially together with such a force that the two coupling parts 15a, 15b enter into locking engagement with each other. The force which is required to ensure that the two coupling parts 15a, 15b adopt the coupled position is solely dependent on the design of the coupling member 15. The fact that the coupling member of the particular type is generally suited to being manually maneuverable means that the force which is generally needed is very limited and can be comfortably applied, without aids, by an individual.

The coupling member 15, which has the form of a pneumatic coupling member, can advantageously be formed by a pneumatic coupling member of the rapid-coupling type. Furthermore, the shaft 23 can be formed by a pipe with associated coupling element 40 for conducting air through the safety coupling 1. The safety coupling 1, apart from simply acting as a safety coupling, can also therefore constitute part of a pneumatic system 41 used to obtain a pneumatically controlled clamping and sealing effect between the nozzle and the exhaust-gas source. The invention hence allows all piping required for the pneumatic system to be layable inside the safety coupling. Furthermore, one and the same safety coupling can be used, regardless of whether the extraction device with associated equipment is intended to operate pneumatically or not. Moreover, the safety coupling can also be used, with no or little modification, should an existing extraction system be retrofitted with a nozzle intended to produce a clamping and sealing effect by pneumatic means.

It will be recognized that the above-described actuating member is simply one possible embodiment and that the person skilled in the art, within the scope of the invention, can find many other solutions with maintained functioning.

In the description above, the first section 10 of the safety coupling has been described as having been fitted in the nozzle 3, and the second section in the duct system 6. It will be recognized that the reverse situation can prevail. Furthermore, the above-described embodiment is based on a coupling member 15, the locking member 27 of which is intended to be moved in a direction which is oppositely directed to the direction of joining of the coupling parts 15*a*, 15*b*, whereby the actuating member 24, stop member 26 and elastic element 29 are positioned and configured to act in this motional direction. It will be recognized that the locking member 27 of the coupling member 15 can also be intended to be moved in the direction of joining of the coupling parts 15*a*, 15*b*, and that the actuating member 24, stop member 26 and elastic element 29 are thus, with simple modifications which are obvious to the person skilled in the art, positioned and configured for this motional direction.

Figure 6:
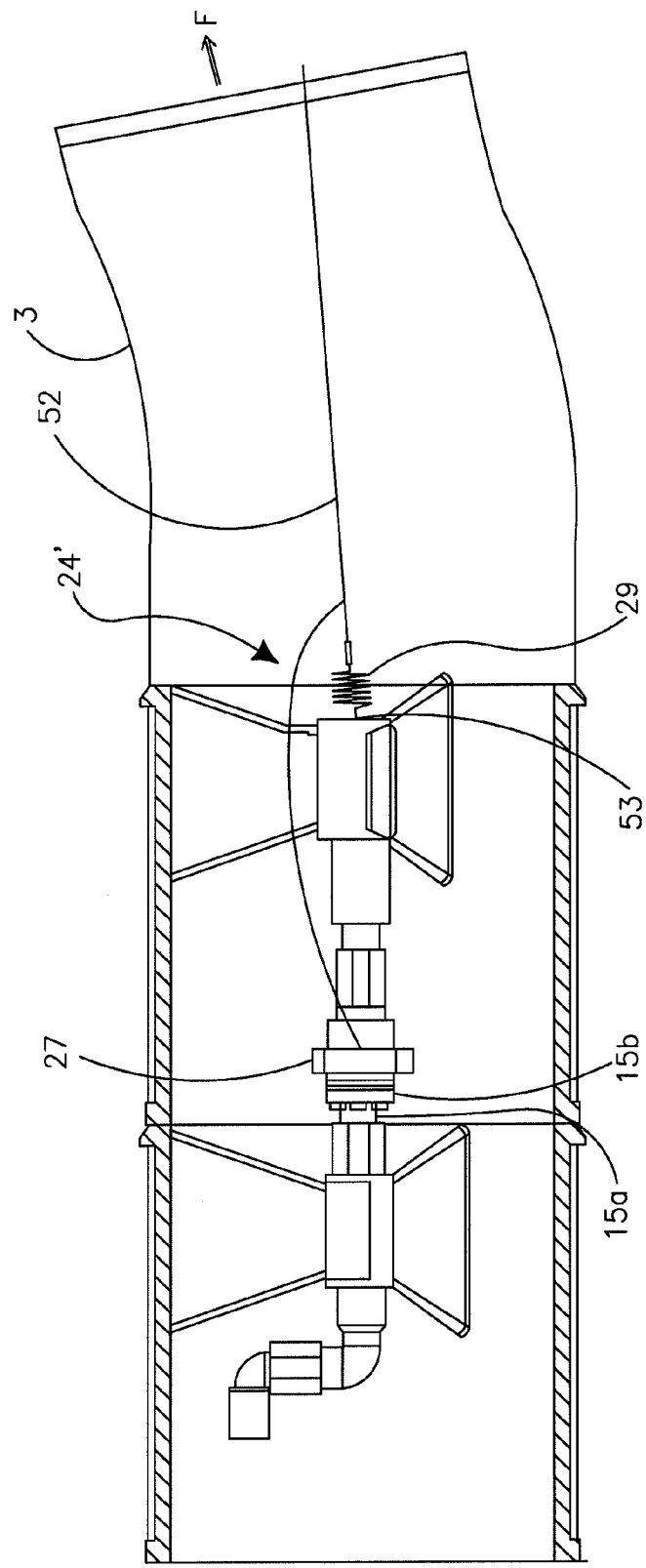
FIG. 6 shows in schematic representation a second embodiment of a safety coupling according to the present invention.

With reference now to FIG. 6, a second embodiment of the present invention is shown in very schematic representation. Unlike the first embodiment, the actuating member 24' is here formed by a wire solution having a first and a second wire 51, 52. The first wire 51 is at its one end connected to the second coupling part 15*b* and the sleeve-like locking member 27 thereof, and at its other end to a first end of an elastic element 29'. The first wire 51 is arranged with a certain slack. This slack can be likened to a stop member 26'. At its other end, the elastic element 29 is fixedly secured to a supporting portion 53. The elastic element 29', at its end opposite to the supporting portion 53, is also connected to a second wire 52, which in turn is intended to be connected to the nozzle 3.

In the illustrated embodiment, the elastic element 29 is formed by a tension spring. Like the first embodiment, the disengagement force is dimensioned by the spring characteristics of the elastic element 29', i.e. in the illustrated embodiment by the spring constant of the tension spring or by pretension of the elastic element in accordance with the above-stated.

The basic functioning is that, when the nozzle 3 and the duct system (not shown) are moved apart, a force F will be transmitted to the coupling member 15 through the extension of the elastic element 29 by the second wire 52. When the displacement between the nozzle and the duct system is sufficiently large for the elastic element to manage to extend the first wire 51 and overcome its slack, the locking member 27 of the second coupling part 15*b* is drawn along in the same direction for decoupling of the engagement between the first and second coupling parts 15*a*, 15*b* of the coupling member and thus disengagement of the safety coupling 1.

It will be recognized that the wire-based actuating member 24' according to the second embodiment can be configured and orientated in a number of different ways depending on, for example, the choice of elastic element.

Figure 7:
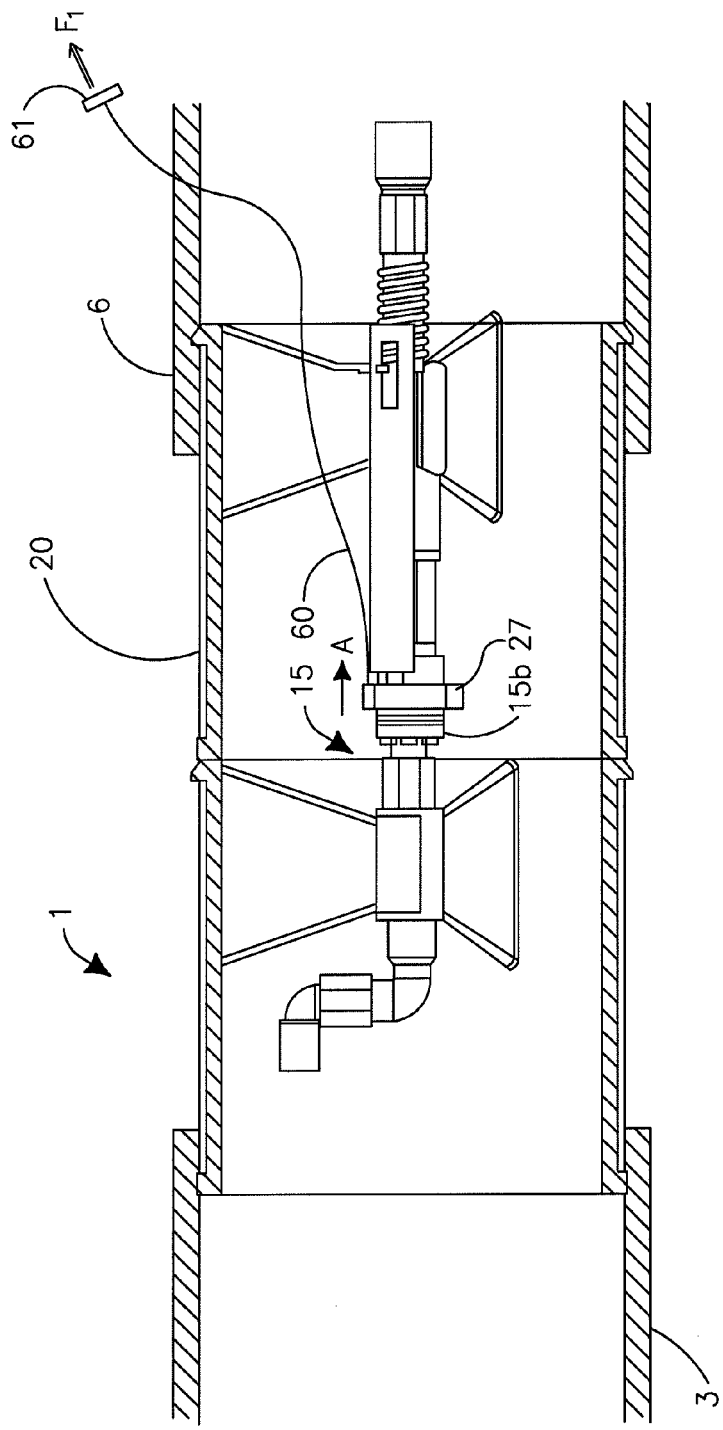
FIG. 7 shows in schematic representation an embodiment in which the safety coupling can be maneuvered from the outside of the nozzle, or alternatively the duct system.

With reference now to FIG. 7, an embodiment is shown in which the safety coupling 1 can be maneuvered from the outside of the nozzle, or alternatively the duct system, so as to move the coupling member 15 from the coupled position into the decoupled position. The user can hence easily change nozzle should different nozzle diameters, for example, be required.

In the illustrated embodiment, the second coupling part 15*b* of the coupling member 15, and more precisely its locking member 27, is connected to a wire 60, which is arranged to extend through the wall in the duct system 6 to which the second section 20 of the safety coupling is connected. The wire 60 comprises at its free end a gripping surface 61. When the safety coupling 1 is installed between a nozzle 3 and a duct system 6, the user can easily release the connection between them by quite simply pulling on the wire 60 with a force F1. The wire 60 will then move the locking member 27 (see arrow A) to allow the coupling member 15 to be moved from the coupled position into the decoupled position. It will be recognized that a corresponding effect can be obtained by the wire, instead of being connected to the locking member, being connected to the actuating member.

It will be recognized that the present invention is not limited to the illustrated embodiments. A number of modifications and variants are possible and the invention is consequently defined solely by the appended claims.

The invention claimed is:

1. A safety coupling, for the releasable connection of a nozzle to a duct system, which nozzle and duct system form part of an extraction system, comprising:

a first section and a second section, and a coupling member having a first coupling part, which is adapted for fitting in the nozzle, via one of said first and second sections, and a second coupling part, which is adapted for fitting in the duct system via another one of the said first and second sections, which coupling member is a pneumatic rapid-coupling member, said first and second coupling parts being adapted to be brought together for connection of the nozzle to the duct system while allowing a through passage between said first and second sections and said coupling member, and the coupling member, in the joined state of the coupling parts, being adjustable between a coupled position, in which the coupling parts are coupled together to lock the connection of the nozzle to the duct system, and a decoupled position, in which the coupling parts are separable to allow release of the nozzle from the duct system, and an actuating member, which is arranged to move the coupling member from the coupled position into the decoupled position when the coupling member is subjected to a disengagement force exceeding a predetermined limit value.

2. A safety coupling according to claim 1, in which the force which is needed to bring together the coupling parts into said joined state is less than the limit value of said disengagement force.

3. A safety coupling according to claim 1, in which the actuating member is arranged to move the coupling member from the coupled position into the decoupled position following a predetermined displacement of the nozzle and the duct system in the direction away from each other, the force which is required to produce this displacement being defined by an elastic element.

4. A safety coupling according to claim 3, in which said predetermined displacement is determined by a stop member cooperating with the actuating member.

5. A safety coupling according to claims 4, in which the actuating member, the coupling part engaging with the actuating member, and said elastic element are disposed on a common shaft.

6. A safety coupling according to claim 4, in which the limit value of said disengagement force is determined by the spring characteristics of the elastic element.

7. A safety coupling according to claim 3, in which said actuating member is arranged to engage with one of the two coupling parts of the coupling member, which coupling part constitutes a female part.

8. A safety coupling according to claims 7, in which the actuating member, the coupling part engaging with the actuating member, and said elastic element are disposed on a common shaft.

9. A safety coupling according to claim 3, in which the actuating member, the coupling part engaging with the actuating member, and said elastic element are disposed on a common shaft.

10. A safety coupling according to claim 9, in which said shaft constitutes a part of a pneumatic system.

11. A safety coupling according to claim 9, in which the limit value of said disengagement force is determined by the spring characteristics of the elastic element.

12. A safety coupling according to claim 3, in which the limit value of said disengagement force is determined by the spring characteristics of the elastic element.

13. A safety coupling according to claim 3, in which said elastic element is a spring element, said limit value being set by the choice of spring constant of the spring element.

14. A safety coupling according to claim 3, in which said elastic element is an elastomer, said limit value being set by the choice of modulus of elasticity of the elastomer.

15. A safety coupling according to claim 3, in which said disengagement force is adjusted by pretension of said elastic element.

16. A safety coupling according to claim 1, in which said coupling member constitutes a part of a pneumatic system. characteristics of the elastic element.

17. A safety coupling according to claim 7, in which the limit value of said disengagement force is determined by the spring characteristics of the elastic element.

* * * * *